(12) United States Patent
Hardy et al.

(10) Patent No.: US 8,538,392 B2
(45) Date of Patent: *Sep. 17, 2013

(54) SYSTEM AND METHOD FOR INTERRUPT CONTROL ON A HANDHELD DEVICE

(75) Inventors: Michael Thomas Hardy, Waterloo (CA); Gerhard Dietrich Klassen, Waterloo (CA); Christopher R. Wormald, Kitchener (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,515

(22) Filed: Jul. 15, 2011

(65) Prior Publication Data

US 2011/0269431 A1  Nov. 3, 2011

Related U.S. Application Data

(63) Continuation of application No. 12/176,823, filed on Jul. 21, 2008, now Pat. No. 8,005,496, which is a continuation of application No. 11/068,076, filed on Feb. 28, 2005, now Pat. No. 7,418,265.

(60) Provisional application No. 60/567,598, filed on May 3, 2004.

(51) Int. Cl.
*H04L 12/58* (2006.01)

(52) U.S. Cl.
USPC ............... 455/414.2; 455/414.3; 455/412.1; 455/412.2; 455/415; 455/432

(58) Field of Classification Search
USPC .......... 455/414.2, 414.3, 414.4, 412.1, 412.2, 455/415, 432, 450, 452.1, 464, 466
See application file for complete search history.

(56) References Cited

U.S. PATENT DOCUMENTS

| | | | |
|---|---|---|---|
| 6,038,438 A | 3/2000 | Beeson et al. | |
| 6,658,260 B2 * | 12/2003 | Knotts | 455/466 |
| 6,724,872 B1 | 4/2004 | Moore et al. | |
| 6,745,021 B1 | 6/2004 | Stevens | |
| 6,869,016 B2 | 3/2005 | Waxelbaum | |
| 7,034,691 B1 | 4/2006 | Rapaport et al. | |
| 7,146,130 B2 | 12/2006 | Hsu et al. | |
| 7,171,190 B2 * | 1/2007 | Ye et al. | 455/412.1 |

(Continued)

FOREIGN PATENT DOCUMENTS

| | | |
|---|---|---|
| GB | 2376608 | 12/2002 |
| WO | 02 052870 | 7/2002 |

(Continued)

OTHER PUBLICATIONS

International Search Report for PCT/CA2005/000290 dated Jun. 28, 2005.

*Primary Examiner* — Patrick Edouard
*Assistant Examiner* — Julio Perez
(74) *Attorney, Agent, or Firm* — Jones Day

(57) ABSTRACT

An interrupt message is sent over one of a plurality of transport mediums from a first mobile device to a second mobile device. The interrupt message may include a first mobile device identifier associated with a transport medium that is independent of the plurality of transport mediums. Upon receipt of the interrupt message at the second mobile device an interruption of any current mobile device operation may occur to notify a user of the interrupt message.

17 Claims, 7 Drawing Sheets

(56) References Cited

U.S. PATENT DOCUMENTS

| | | |
|---|---|---|
| 2002/0116499 A1 | 8/2002 | Enns et al. |
| 2002/0199009 A1 | 12/2002 | Willner et al. |
| 2003/0100321 A1 | 5/2003 | Rao et al. |
| 2003/0194990 A1 | 10/2003 | Helferich |
| 2004/0103158 A1 | 5/2004 | Vella et al. |
| 2004/0104808 A1 | 6/2004 | Khoshbin |
| 2004/0176114 A1 | 9/2004 | Northcutt |
| 2004/0185883 A1 | 9/2004 | Rukman |
| 2004/0192263 A1 | 9/2004 | Tomikawa et al. |
| 2004/0203622 A1 | 10/2004 | Esque et al. |
| 2005/0114533 A1 | 5/2005 | Hullfish et al. |
| 2005/0157859 A1 | 7/2005 | Rodriguez et al. |
| 2005/0164682 A1 | 7/2005 | Jenkins et al. |
| 2005/0176412 A1 | 8/2005 | Krischker et al. |
| 2005/0223062 A1* | 10/2005 | Doan et al. .................... 709/206 |
| 2006/0080517 A1 | 4/2006 | Brown |

FOREIGN PATENT DOCUMENTS

| | | |
|---|---|---|
| WO | 03 009616 A1 | 1/2003 |
| WO | 03 069924 A2 | 8/2003 |
| WO | 03 096559 | 11/2003 |

* cited by examiner

US 8,538,392 B2

SYSTEM AND METHOD FOR INTERRUPT CONTROL ON A HANDHELD DEVICE

This is a continuation of U.S. patent application Ser. No. 12/176,823, filed Jul. 21, 2008, which is a continuation of U.S. patent application Ser. No. 11/068,076, filed Feb. 28, 2005 (now U.S. Pat. No. 7,418,265), which claims the benefit of U.S. Provisional Application No. 60/567,598, filed May 3, 2004, all the above applications hereby incorporated herein by reference.

This disclosure generally relates to mobile communication devices, and particularly relates to processing time sensitive messages.

A communication may be routine, which may or may not invite a reply, or may be time sensitive, which may require a prompt reply. For example, a routine message may be an e-mail message that includes marketing materials to be approved within the next ten days. A time sensitive message may be a message conveying a last-minute change of the scheduled start time of a meeting. Messages of the latter type often request an immediate response from the recipient, as the sender often desires acknowledgement that the recipient has received the message.

When such time sensitive messages are communicated by voice, e.g., a phone call or a "push-to-talk" cellular operation, the sender receives immediate acknowledgement from the recipient. However, when time sensitive messages are communicated via data transmission, e.g., e-mail, short messaging service (SMS) or other such transport mediums commonly supported by mobile communication devices, the sender may not receive acknowledgement from the recipient in a timely manner. Furthermore, the sender may not receive notification of receipt of a time sensitive message by the recipient's mobile communication device.

Disclosed herein are systems and methods for facilitating an interrupt message between a plurality of mobile communication devices. The mobile devices may support a plurality of transport mediums. An interrupt message is sent over one of a plurality of transport mediums from a first mobile device to a second mobile device. The interrupt message may include a mobile device identifier associated with one of the plurality of transport mediums and independent of the transport medium over which the interrupt message is sent. Upon receipt of the interrupt message at the second mobile device, an interruption of any current mobile device operation may occur to notify a recipient user of the interrupt message.

DRAWINGS

FIG. 1 is an example structure block diagram of a system for providing an interrupt message between a plurality of mobile devices;

FIGS. 2 and 3 provide an example process flow diagram for a method of providing an interrupt message between a plurality of mobile devices;

DETAILED DESCRIPTION

Figure 1:
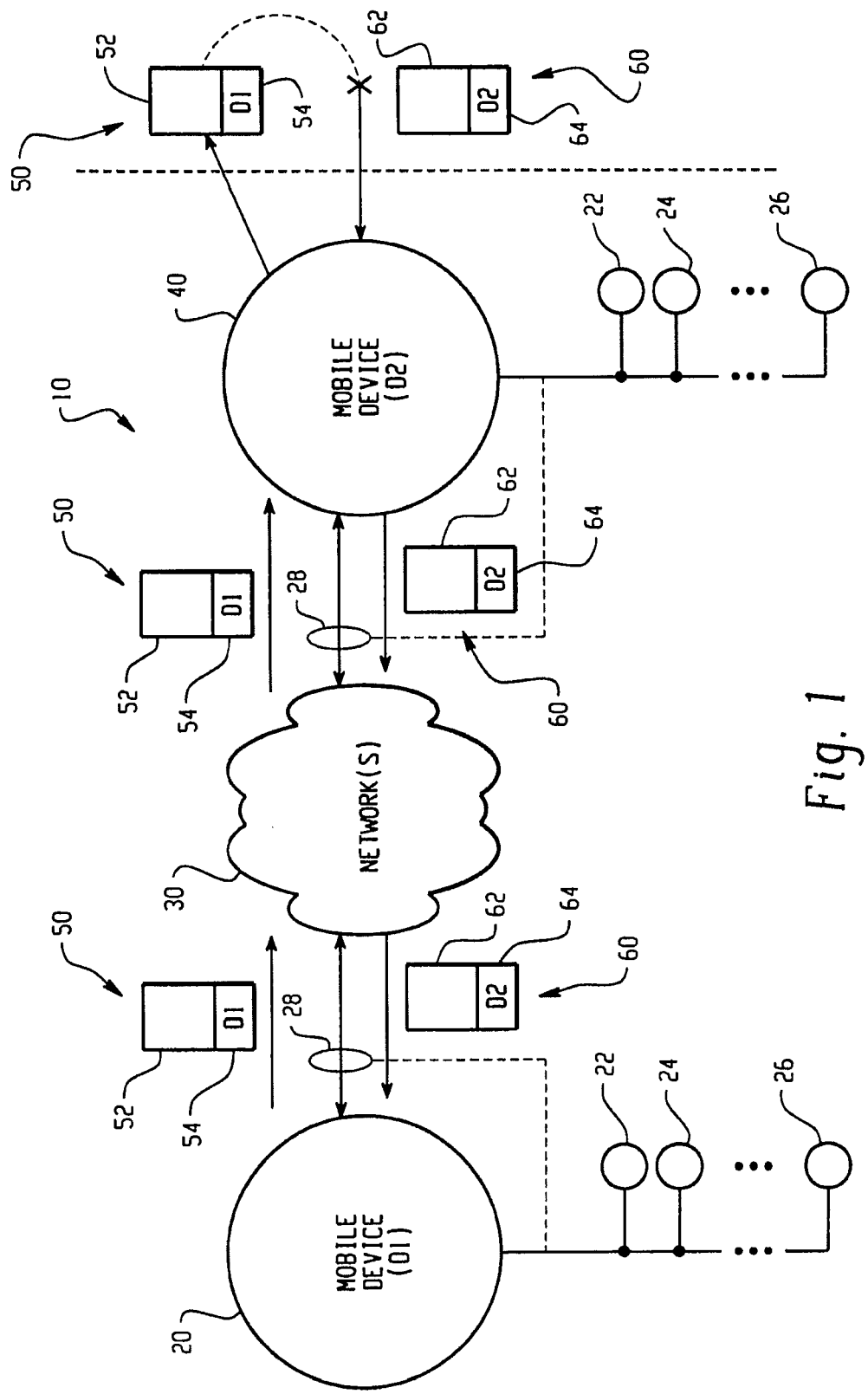

FIG. 1 is an example structure block diagram of a system 10 for providing an interrupt message between a plurality of mobile communication devices 20 and 40. The first mobile device 20 may support a plurality of communications modes 22, 24 and 26 for communicating over one or more networks 30. Each communication mode 22, 24 and 26 may be associated with a particular transport medium, as indicated by the associated reference loop 28. For example, if the communication modes 22, 24, and 26 are e-mail, PIN and SMS, respectively, then the associated transport mediums may include an e-mail transport medium, a PIN transport medium, (e.g., a transport medium for communications addressed by a SIM PIN associated with a user of a mobile device or a unique identifier associated with a mobile device), and an SMS transport medium. Additional communication modes and corresponding transport mediums may also be supported, depending on the communication capabilities of the mobile device 20. The second mobile device 40 may likewise support a plurality of similar communication functions 22, 24 and 26 associated with transport mediums 28 over the networks 30.

An interrupt message 50 facilitates time critical communication between the mobile devices 20 and 40. The interrupt message 50 may comprise a message portion 52 and a first mobile device identifier 54 associated with one of the plurality of transport mediums 28. In the example of FIG. 1, the first mobile device identifier 54 comprises a mobile device PIN number D1 associated with a PIN transport medium.

At any given time, the mobile device 20 may not be presently operable to receive data over one or more of the transport mediums 28; likewise, the mobile device 40 may not be presently operable to receive data over one or more of the transport mediums 28. For example, the mobile device 20 may be out of data coverage for the transport medium associated with communication mode 22, but may be in data coverage for the transport medium associated with communication modes 24 and 26. Thus, the mobile device 20 may be presently operable to receive and send PIN and SMS communications, but not presently operable to receive e-mail communications.

In one embodiment, the mobile device 20 is operable to automatically select a transport medium 28 for an interrupt message 50. In this embodiment, the sender does not need to choose a particular transport medium; the mobile device 20 determines which transport mediums 28 are available and may select the fastest and/or most robust transport medium available.

The automatically-selected transport medium may be independent of the transport medium associated with the mobile device identifier 54, i.e., the automatically-selected transport medium need not necessarily be the transport medium associated with the mobile device identifier 54. Thus, selection of the transport medium for transmitting the interrupt message is independent of the mobile device identifier 54 that may be included in the interrupt message. For example, the mobile device identifier 54 may comprise a mobile device PIN D1, which is associated with a PIN transport medium, but the automatically-selected transport medium may be the SMS transport medium or the e-mail transport medium.

In this example embodiment, the mobile device identifier 54 is included so that the recipient may establish a quick messaging session with the sender. The quick messaging session may be independent of the communication mode and associated transport medium over which the interrupt message 50 was transmitted. For example, upon receiving an interrupt message by e-mail, the user of the mobile device 40 may establish a peer-to-peer communication with the mobile device 20 over the PIN transport medium.

Interrupt message indicia to identify the message 50 as an interrupt message type may be included in the message body 52, or may be included with the mobile device identifier 54. In one embodiment, the presence of the mobile device identifier 54 provides the indicia of an interrupt message.

Upon receiving a message over one of the transport mediums 28, the second mobile device 40 determines if the received message is an interrupt message 50. This determination may be made based on the interrupt message indicia. If the message is determined to be an interrupt message 50, then the second mobile device 40 may be operable to interrupt any current operation or operating mode. For example, if the user of the mobile device 40 is viewing an Internet web page or drafting a document on the mobile device 40, then the Internet session or editor program may be interrupted with a notification of receipt of an interrupt message 50.

In one embodiment, a dialogue box in the user interface will appear, indicating an incoming interrupt message 50. The user of the mobile device 40 will have the choice of answering or ignoring the incoming interrupt message 50. In one embodiment, if the user answers the interrupt message 50, the user is presented with an option to send an automatic acceptance confirmation message back to the first mobile device 20, or to send a custom reply message back to the first mobile device 20. The custom reply message may comprise a similar interrupt message 60, which includes a message portion 62 and a device identifier 64. Alternatively, the custom reply may comprise a request to establish a peer-to-peer communication between the first and second mobile devices 20 and 40 so that both users may communicate in real time. Other custom reply messages may also be used.

In another embodiment, the second mobile device 40 sends a delivery notification message back to the first mobile device 20 upon detecting that the received message from the first mobile device 20 is an interrupt message 50. The delivery notification message is sent independently of any user action, and thus the sender of the interrupt message 50 is notified of receipt of the interrupt message 50 independent of any action by the recipient user.

In another embodiment, the interrupt message will be transmitted to the second mobile device 40 over an SMS transport if the second mobile device 40 is operating in a telephone communication mode. In this embodiment, the user of the second mobile device 40 will still be able to choose to accept the message and on such acceptance a delivery confirmation message is sent back to the first mobile device 20. The user of the second mobile device 40, however, must terminate the telephone communication mode if the user desires to reply to the interrupt message 50.

Figure 2:
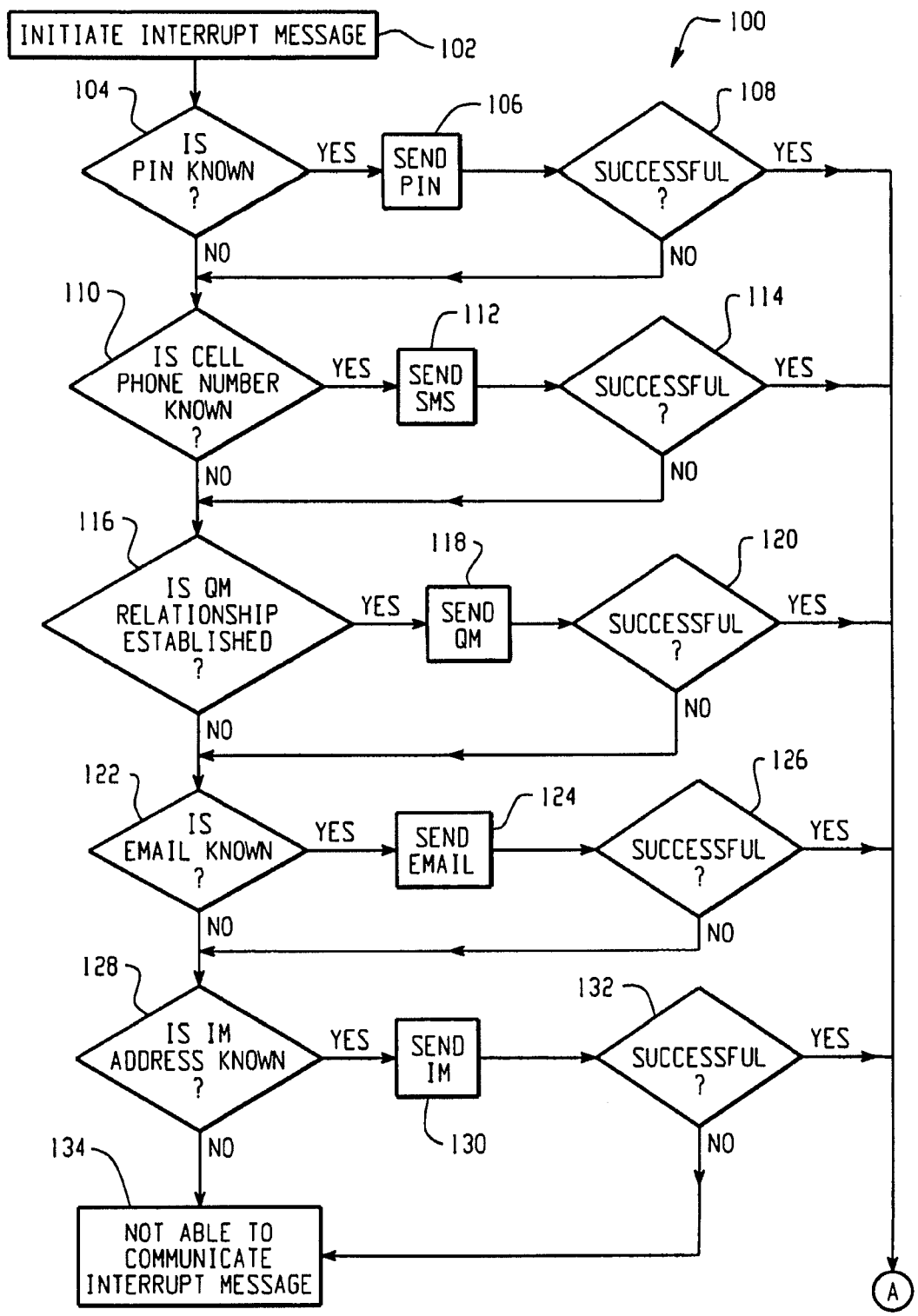
Figure 3:
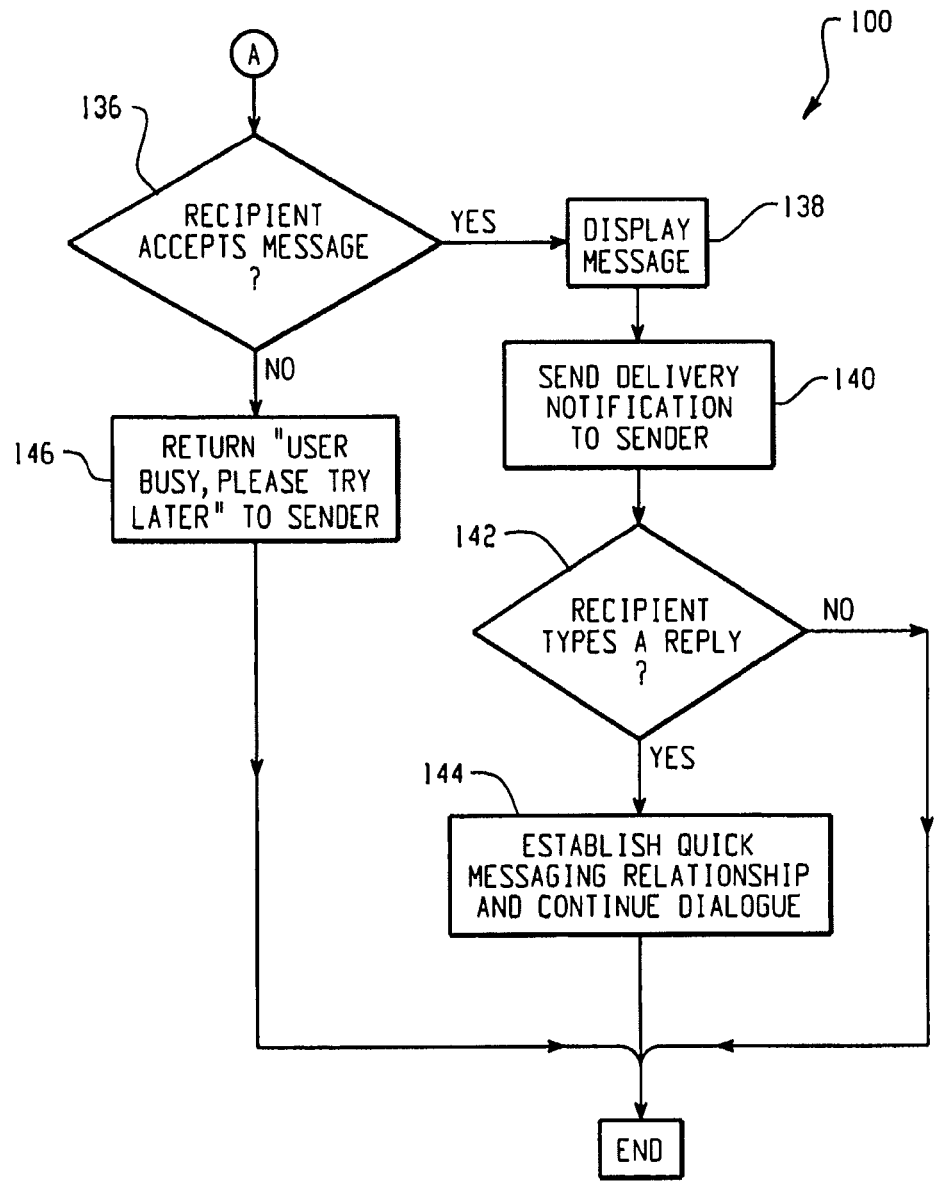

FIGS. 2 and 3 provide an example process flow diagram 100 for a method of providing an interrupt message between a plurality of mobile devices. In step 102, a user of a first mobile device initiates an interrupt message to be sent to a recipient associated with a second mobile device. The interrupt message may be initiated by a menu option, an address book option, or by some other initiation process.

In step 104, the first mobile device determines if the PIN of the second mobile device is known. If the PIN of the second mobile device is known, then in step 106 the interrupt message is transmitted over the PIN transport medium. Thereafter, step 108 determines if the interrupt message was successfully transmitted. This determination may be made, for example, by receipt of a delivery notification message automatically sent by the second mobile device within a specified time period, or by the receipt of an error message. If step 108 determines that the interrupt message was not successfully sent, then step 110 is executed.

In step 110, the first mobile device determines if the cellular number of the second mobile device is known. If the cellular number of the second mobile device is known, then in step 112 the interrupt message is transmitted over the SMS transport medium. Thereafter, step 114 determines if the interrupt message was successfully transmitted. This determination may be made, for example, by receipt of a delivery notification message automatically sent by the second mobile device within a specified time period, or by the receipt of an error message. If step 114 determines that the interrupt message was not successfully sent, then step 116 is executed.

In step 116, the first mobile device determines if a quick message relationship has been established between the first and second mobile devices. If a quick message relationship has been established, then in step 118 the interrupt message is transmitted via a quick message. Thereafter, step 120 determines if the interrupt message was successfully transmitted. This determination may be made, for example, by receipt of a delivery notification message automatically sent by the second mobile device within a specified time period, or by the receipt of an error message. If step 120 determines that the interrupt message was not successfully sent, then step 122 is executed.

In step 122, the first mobile device determines if the e-mail address of the second mobile device is known. If the e-mail address of the second mobile device is known, then in step 124 the interrupt message is transmitted over the e-mail address transport medium. Thereafter, step 126 determines if the interrupt message was successfully transmitted. This determination may be made, for example, by receipt of a delivery notification message automatically sent by the second mobile device within a specified time period, or by the receipt of an error message. If step 126 determines that the interrupt message was not successfully sent, then step 128 is executed.

In step 128, the first mobile device determines if an instant message address of the second mobile device is known. If the instant message address of the second mobile device is known, then in step 130 the interrupt message is transmitted via an instant message. Thereafter, step 132 determines if the interrupt message was successfully transmitted. This determination may be made, for example, by receipt of a delivery notification message automatically sent by the second mobile device within a specified time period, or by the receipt of an error message. If step 132 determines that the interrupt message was not successfully sent, then step 134 issues an error message to notify the user of the first mobile device that the interrupt message could not be sent.

If any of steps 108, 114, 120, 126 or 132 determine the interrupt message was successfully sent, then processing of the interrupt message continues at the second mobile device, as illustrated in FIG. 3. Beginning at step 136, the second mobile device determines whether the recipient user accepts the interrupt message.

If the second mobile device determines that the user accepts the interrupt message, then step 138 displays the interrupt message, and step 140 sends a delivery notification message back to the first mobile device.

In one embodiment, the delivery notification may be sent over a transport medium that is independent of the transport medium over which the interrupt message was sent. For example, if the interrupt message was sent over a PIN transport medium, the delivery notification may be sent over an e-mail transport medium.

In another embodiment, the delivery notification may be sent over a transport medium that is associated with the sender's mobile device identifier included in the interrupt message. For example, if the interrupt message was sent over an SMS transport medium, the delivery notification may be sent over a PIN transport medium.

Step 142 determines whether the user of the second mobile device types a reply to the interrupt message. If the user does type a reply to the interrupt message, step 144 establishes a Quick Messaging relationship between the first and second mobile devices so that the users may communicate in real time. Processing of the interrupt message is then complete, and the process ends.

Returning to step 136, if the second mobile device determines that the user does not accept the interrupt message, then step 146 transmits a "User Busy" reply message to the first mobile device, and the process ends.

In another embodiment, receiving an interrupt message at a mobile device automatically interrupts any current mobile device operation and displays the interrupt message. Thereafter, the user of the mobile device may be precluded from resuming normal mobile device operations until the user acknowledges the interrupt message. Accordingly, the sender of the interrupt message is assured that the recipient will have read the interrupt message.

Transport mediums may also be selected by other methods. For example, in another embodiment, transport mediums may be selected according to a session initiated protocol (SIP). SIP is a text-based signaling protocol, similar to HTTP and SMTP, for initiating interactive communication sessions between users.

Figure 4:
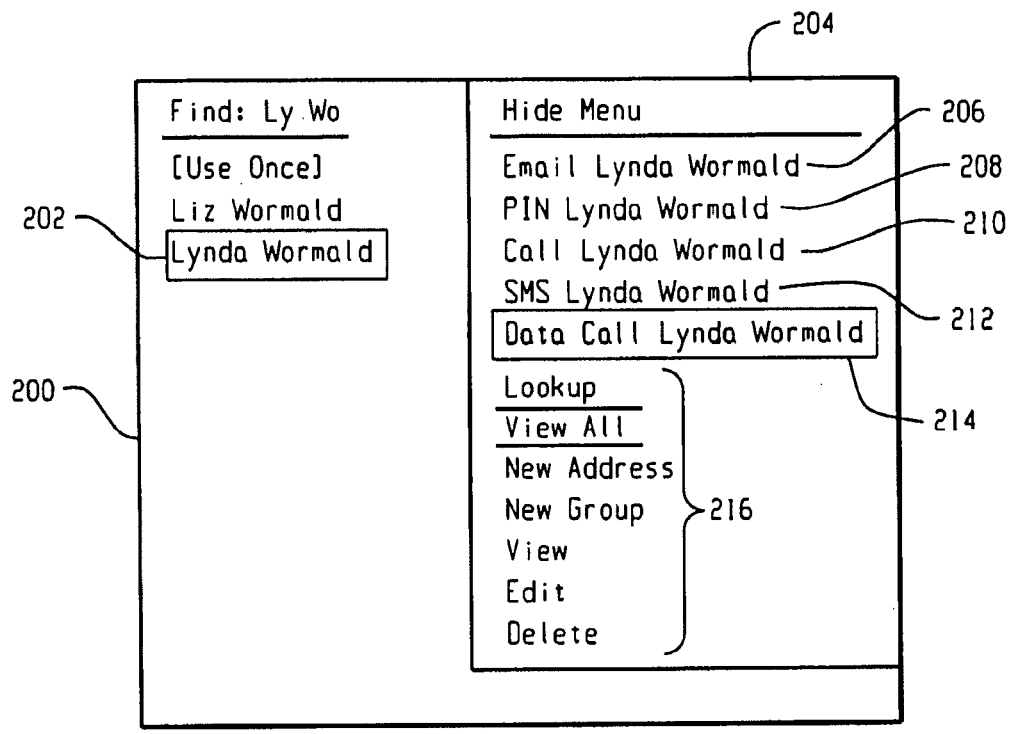
FIG. 4 is an illustration of an example program environment for creating an interrupt message.

FIG. 4 is an illustration of an example program environment 200 for creating an interrupt message. The program environment 200 may be generated after searching for contact information of an intended recipient. A first selection bar 202 indicates an intended message recipient, and a menu window 204 displays a plurality of communication options 206, 208, 210, 212 and 214 that may be used to communicate with the intended recipient. Additional functions 216, such as address book functions, may also be displayed in the menu window 204.

In this example, the mobile device has e-mail, PIN, telephone and SMS contact data associated with the intended recipient. Accordingly, a message may be sent to the intended recipient via an e-mail option 206, a PIN option 208, a telephone call option 210, or an SMS option 212.

A data call option 214 is used to invoke an interrupt message. Upon selecting a data call option 214, an interrupt message will be created. The user of the mobile device may then prepare the interrupt message, which may comprise a short text message, and the mobile device will then transmit the interrupt message to another mobile device associated with the intended recipient. As described with respect to FIGS. 1-3 above, the interrupt message may be sent over one of a plurality of transport mediums in accordance with an automatic selection routine.

Figure 5:
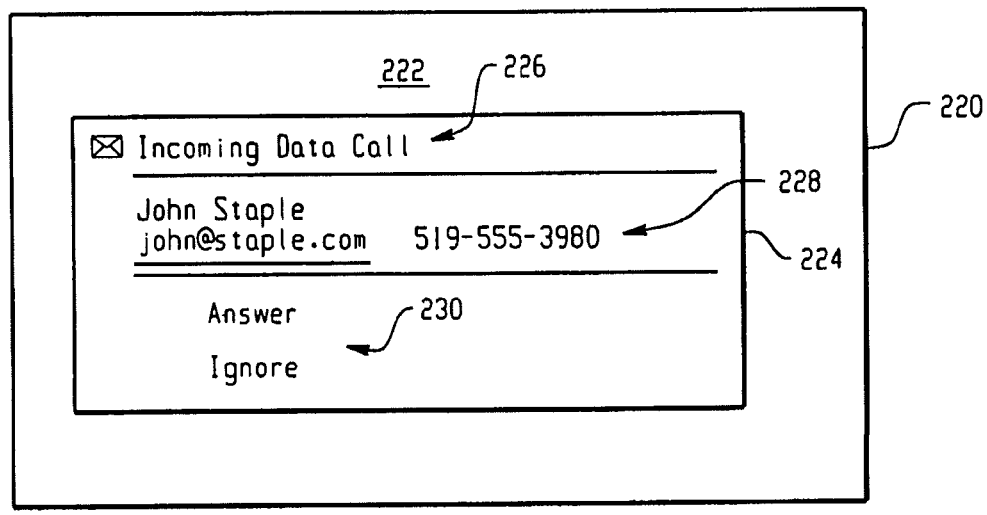
FIG. 5 is an illustration of an example program environment in which a user of a mobile device is notified that an interrupt message has been received.

FIG. 5 is an illustration of an example program environment 220 in which a user of a mobile device is notified that an interrupt message has been received. The program environment may comprise a window 222 associated with an existing mobile device operation, e.g., composing a document, viewing web pages on the Internet, and the like. Upon identifying a received interrupt message, a notification window 224 interrupts the current mobile device operation to notify the user of the mobile device that an interrupt message has been received. The notification window 224 may include interrupt message title 226, sender contact data 228, and user selectable options 230. The user options may include an answer option and an ignore option. If the recipient user selects one of the decline or ignore options, the mobile device of the recipient may automatically send a delivery notification message to the sender. The interrupt environment of FIG. 5 ensures that the user of the mobile device is aware that an interrupt message has been received.

Figure 6:
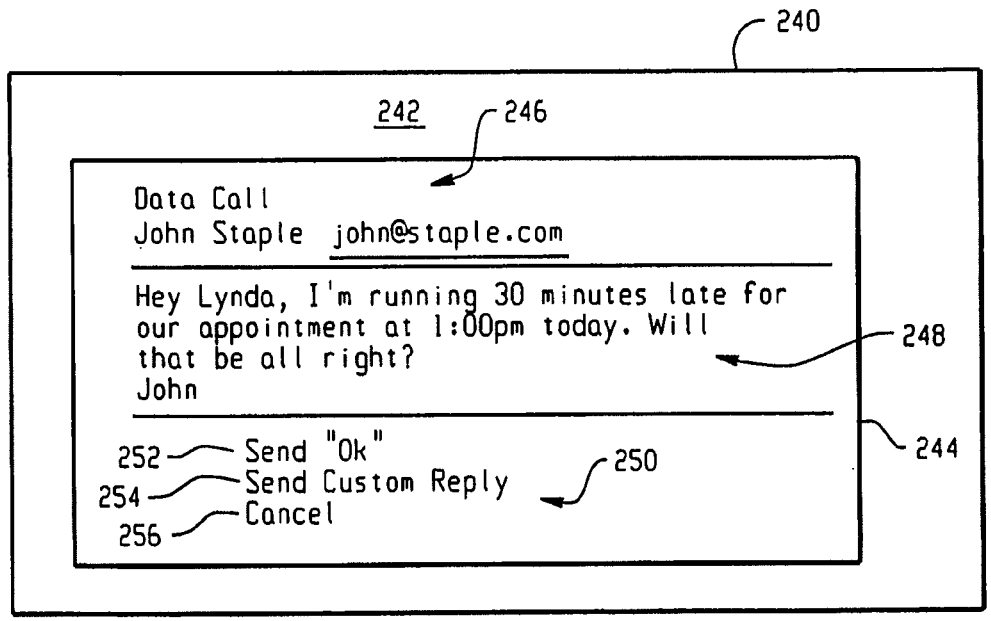
FIG. 6 is an illustration of an example program environment in which a user may reply to interrupt message.

If the recipient selects the answer option, then the user may have one or more reply options available. FIG. 6 is an illustration of an example program environment 240 in which a user may reply to an interrupt message after selecting an answer option. The program environment may comprise the window 222 associated with the existing mobile device operation, e.g., composing a document, viewing web pages on the Internet, and the like. An interrupt message reply window 244 may include default sender contact data 246, a message window 248, and selectable user options 250.

The selectable user options 250 may include a default acknowledgement command 252, a custom reply command 254, and a cancel command 256. Selecting the default acknowledgement command 252 will cause the recipient's mobile device to send a default acknowledgement message to the sender's mobile device, such as a simple "OK" message. In one embodiment, the default acknowledgement message is sent over the transport medium associated with the default sender contact data 246. In another embodiment, the default acknowledgement message is sent over the transport medium associated with the sender's mobile device identifier included in the interrupt message.

Selecting the custom reply command 254 will cause the recipient's mobile device to send a custom reply to the sender's mobile device. In one embodiment, the custom reply command 254 opens an e-mail editor so that the user may type a specific reply message to be sent to the sender's mobile device. In another embodiment, the custom reply command 254 establishes a peer-to-peer communication between the recipient's mobile device and the sender's mobile device. The peer-to-peer communication between the mobile devices may be established in accordance with the sender's mobile device identifier included in the interrupt message. For example, if the sender's mobile device identifier included in the interrupt message is a mobile device PIN, then a quick message session may be established over the PIN transport medium. Other peer-to-peer sessions similar to a quick message session may also be used; for example, a peer-to-peer session based on unique identifiers associated with the mobile devices may be established. Each unique identifier may be an identifier other than a mobile device identifier; for example, each unique identifier may be associated with a user account that is, in turn, associated with a particular mobile device.

Figure 7:
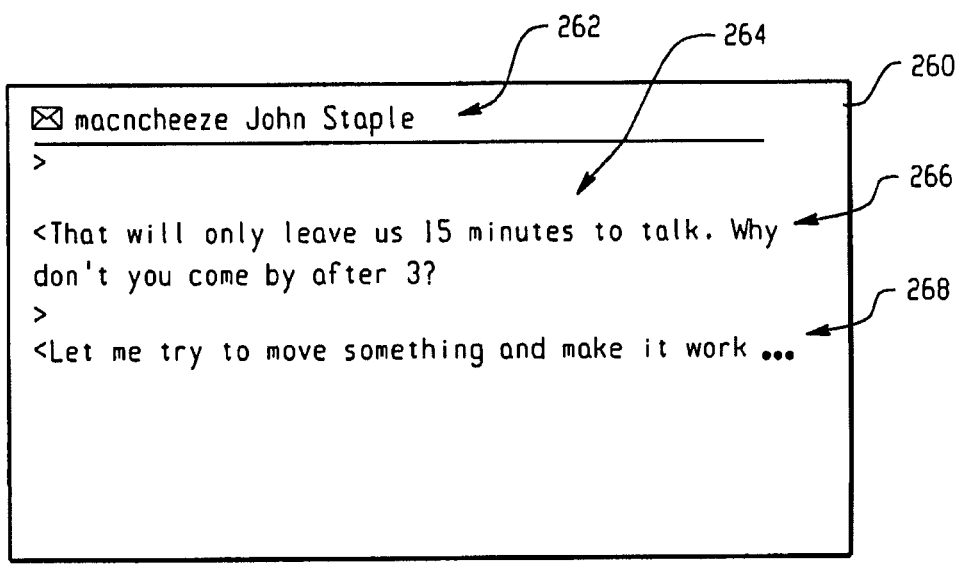
FIG. 7 is an illustration of an example Quick Message environment for replying to an interrupt message.

FIG. 7 is an illustration of an example quick message environment 260 for replying to an interrupt message. The quick message environment 260 may be invoked by selecting the custom reply command 254, and may comprise identifier data 262 that identifies a participant in the quick message and a message window 264. The message window 264 may comprise a first quick message 266 by which the recipient of the interrupt message responded to the sender, and a second quick message 268 issued by the sender in response to the first quick message 266.

Figure 8:
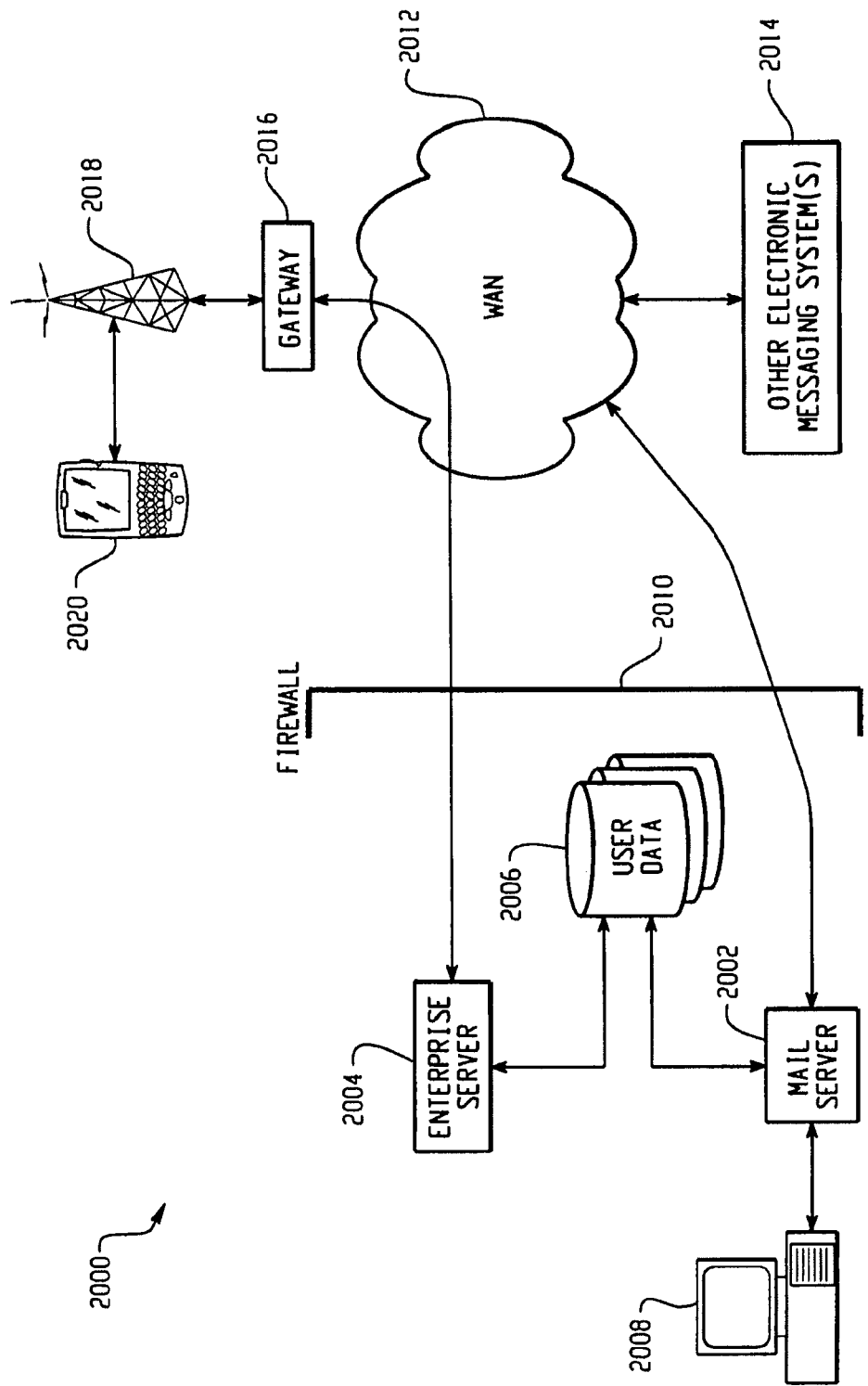
FIG. 8 is a block diagram of an example system for redirecting electronic messages to and from a mobile communication device.

FIG. 8 is a block diagram of an example system 2000 for redirecting electronic messages to and from a mobile communication device 2020. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packets(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 9:
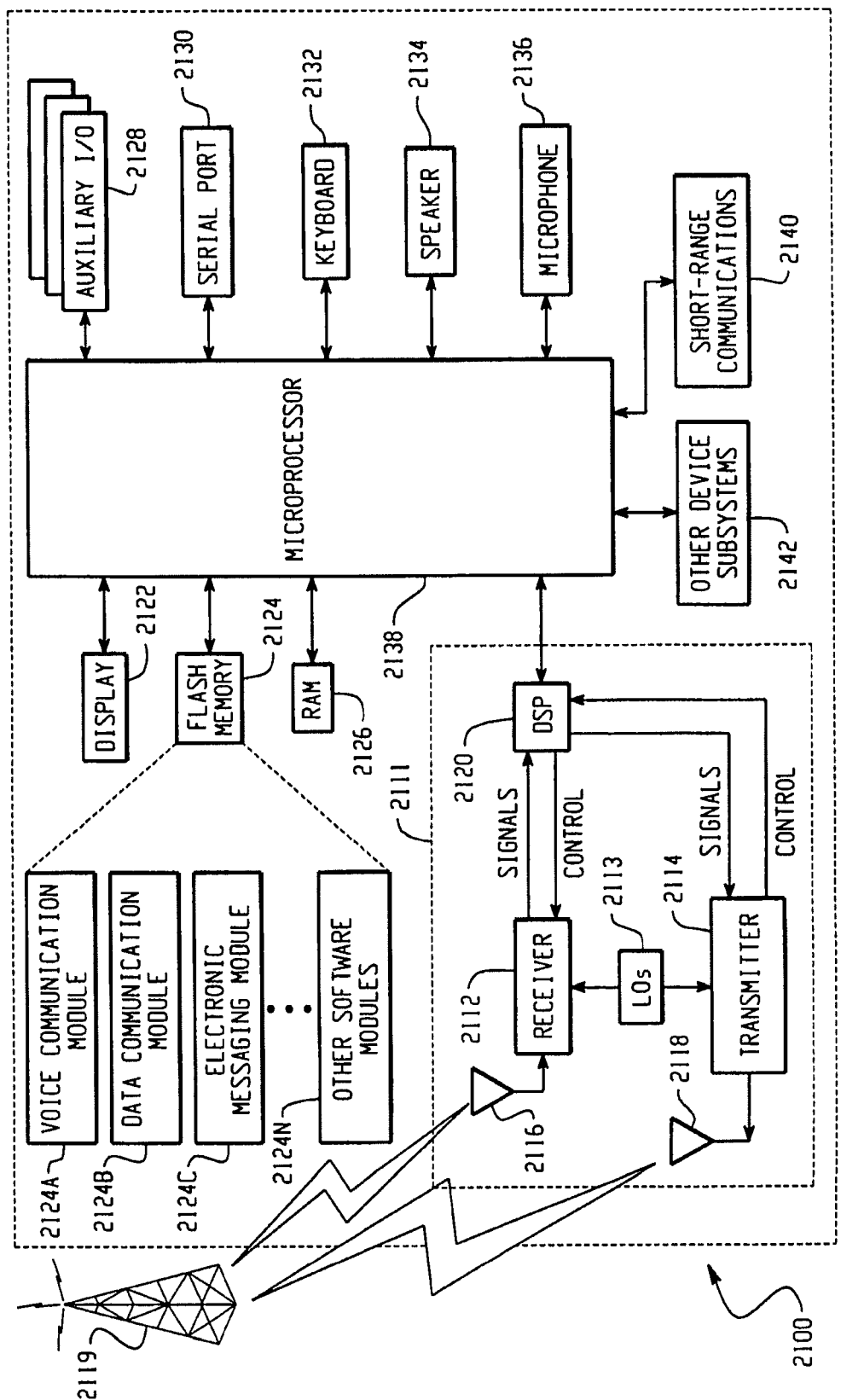
FIG. 9 is a block diagram illustrating an example mobile communication device.

FIG. 9 is a block diagram illustrating an example mobile communication device 2100. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The apparatus, methods, flow diagrams, and structure block diagrams described in this patent document may be implemented in the mobile devices described herein by mobile device program code comprising program instructions that are executable by the mobile device processing subsystem. Other implementations may also be used, however, such as firmware or even appropriately designed hardware configured to carry out the methods and flow diagrams described in this patent document. Additionally, the flow diagrams and structure block diagrams described herein, which describe particular methods and/or corresponding acts in support of steps and corresponding functions in support of disclosed structural means, may also be utilized to implement corresponding software structures and algorithms, and equivalents thereof.

The systems and methods herein have been described in the context of a single message recipient. In another embodiment, a sender of an interrupt message may send the interrupt message to a plurality of recipients. For example, if a meeting is to be cancelled or moved to another location, a sender may send an interrupt message to all meeting attendees to notify the recipients of the change. The interrupt message may be separately processed for each interrupt message recipient as described above.

Although the systems and methods described herein are implemented in mobile devices, other communication devices may also be used to implement these systems and methods. For example, e-mail clients and/or e-mail servers may include software configured to facilitate the methods described herein. Accordingly, in separate embodiment, a desktop computer may be configured facilitate processing of interrupt messages so that it may send interrupt messages to or receive interrupt messages from other communication devices, such as another desktop computer or mobile device.

This written description sets forth the best mode of the claimed invention, and describes the claimed invention to enable a person of ordinary skill in the art to make and use it, by presenting examples of the elements recited in the claims.

The patentable scope of the invention is defined by the claims themselves, and may include other examples that occur to those skilled in the art. Such other examples, which may be available either before or after the application filing date, are intended to be within the scope of the claims if they have structural elements that do not differ from the literal language of the claims, or if they include equivalent structural elements with insubstantial differences from the literal language of the claims.

The invention claimed is:

1. A method of providing an interrupt message, comprising:
   selecting a message recipient to receive an interrupt message; automatically selecting a first data transport medium from among a plurality of data transport mediums over which to send the interrupt message to the selected recipient; and sending the interrupt message over the first data transport medium, the interrupt message including a mobile device identifier associated with a second data transport medium different than the first data transport medium, to enable the message recipient to send a reply over the second transport medium using the mobile device identifier;
   wherein said automatically selecting includes an electronic device automatically selecting the transport medium based on at least one of an availability, a speed and a robustness of the transport medium.

2. The method of claim 1 wherein the mobile device identifier is a PIN identifier.

3. The method of claim 1 further comprising:
   receiving the interrupt message over the first data transport medium; and
   in response to the interrupt message, interrupting one or more current operations to notify a user of the interrupt message.

4. The method of claim 1 wherein the first data transport medium and the second data transport medium are from a group consisting of email, PIN and SMS.

5. The method of claim 1 further comprising:
   determining that the interrupt message sent over the first data transport medium was not received and, in response, sending a subsequent interrupt message over another data transport medium different than the first data transport medium.

6. The method of claim 1 wherein said selecting, said automatically selecting and said sending are performed by a mobile wireless communication device.

7. A method of receiving an interrupt message, comprising:
   receiving, by a mobile communication device, an interrupt message over a first data transport medium, the interrupt message including a mobile device identifier associated with a second data transport medium that is different than the first data transport medium; and
   interrupting, by the mobile communication device, a current operation to display a notification of the interrupt message;
   sending, by the mobile communication device, a reply over the second transport medium using the mobile device identifier;
   wherein the sending of the reply includes automatically sending a delivery notification message indicating delivery of the interrupt message.

8. The method of claim 7 further comprising:
   precluding resumption of the current operation until a reply to the interrupt message is transmitted.

9. The method of claim 7 wherein the delivery notification message is sent over another data transport medium that is different than the first data transport medium.

10. The method of claim 9 wherein the first data transport medium and said another data transport medium are selected from a group consisting of email, PIN and SMS.

11. The method of claim 7 further comprising:
    displaying an option to send an automatic acceptance confirmation message in reply to the interrupt message.

12. The method of claim 7 wherein the reply includes an interrupt message.

13. The method of claim 7 further comprising after the receiving and before the interrupting:
    determining that the received message is an interrupt message based on the second data transport medium, that is associated with the mobile device identifier in the message, being different than the first data transport medium over which the message was received.

14. A method of providing an interrupt message, comprising:
    sending an interrupt message over a first data transport medium, the interrupt message including a mobile device identifier associated with a second data transport medium different than the first data transport medium;
    determining whether the interrupt message sent over the first data transport medium was received; and
    if the interrupt message sent over the first data transport medium was not received, then sending a subsequent interrupt message over another data transport medium different than the first data transport medium;
    the sending of the interrupt message, the determining and the sending of the subsequent interrupt message being performed by a same communication device;
    wherein said determining is by determining whether a reply was received in response to said interrupt message.

15. The method of claim 14 wherein the first data transport medium and said another data transport medium are selected from PIN, SMS, quick message, email and instant messaging transport mediums.

16. The method of claim 14 wherein the reply includes an automatic delivery notification message.

17. The method of claim 14 wherein the reply includes a peer-to-peer communication
    established over the transport medium associated with the mobile device identifier.

* * * * *